(12) United States Patent
Ritchie et al.

(10) Patent No.: US 6,328,114 B1
(45) Date of Patent: Dec. 11, 2001

(54) FROZEN TOPSOIL PLOW

(76) Inventors: Allan Mason Ritchie; Ronald George Ritchie, both of P.O. Box 78, Silver Valley AB (CA), T0H 3E0

( * ) Notice: Subject to any disclaimer, the term of this patent is extended or adjusted under 35 U.S.C. 154(b) by 0 days.

(21) Appl. No.: 09/522,941

(22) Filed: Mar. 10, 2000

(30) Foreign Application Priority Data

Sep. 28, 1999 (CA) .................................................. 2284115

(51) Int. Cl.[7] .................................................. A01B 59/043
(52) U.S. Cl. ..................................... 172/445.1; 172/684.5
(58) Field of Search ............................. 172/684.5, 445.1, 172/448, 449, 699, 700, 811, 445.2; 37/407, 408, 409, 410, 214, 219, 220, 221

(56) References Cited

U.S. PATENT DOCUMENTS

| | | | |
|---|---|---|---|
| 1,379,033 | * | 5/1921 | Matheny ............................. 172/684.5 |
| 1,428,880 | * | 9/1922 | De Mott ............................. 172/684.5 |
| 1,934,488 | * | 11/1933 | Dempster et al. ............ 172/684.5 X |
| 4,359,103 | | 11/1982 | Heitman . |
| 4,655,297 | * | 4/1987 | Bourgeois, Jr. .................... 172/445.1 |
| 5,211,247 | * | 5/1993 | Johnsen .......................... 172/684.5 X |
| 5,213,164 | * | 5/1993 | Mork .............................. 172/684.5 X |
| 5,806,605 | * | 9/1998 | Keigley ................................ 172/145 |

FOREIGN PATENT DOCUMENTS 1146744   10/1980  (CA) .
2237001   7/1998   (CA) .

* cited by examiner

*Primary Examiner*—Victor Batson
(74) *Attorney, Agent, or Firm*—Bennett Jones LLP

(57) ABSTRACT

A plowing implement particularly adapted for breaking up frozen topsoil to a desired and controllable depth includes a backer plate and scraping blade which are both at a swept-back angle to the direction of travel. The scraping blade is preferably made up of a plurality of chisel plates which are spaced apart in a staggered fashion. The implement includes depth control means comprising a depth control shoe that is vertically adjustable.

11 Claims, 5 Drawing Sheets

FROZEN TOPSOIL PLOW

FIELD OF THE INVENTION

The present invention relates to implements for breaking up soil, and in particular to implements for breaking up frozen topsoil to a desired depth below the ground surface.

BACKGROUND OF THE INVENTION

It is a common requirement on construction projects that organic surficial soils (i.e., "topsoil") present on the project site must be removed and stockpiled for eventual replacement after work on the site has been completed, in order to comply with land reclamation provisions contained in environmental legislation. A further common requirement is that the topsoil must be removed to fairly precise tolerances, removing substantially all of the topsoil without removing a significant amount of the clay or other non-organic subsoil underlying the topsoil. This requirement arises from environmental regulations which restrict the permissible amount of "admixing" (i.e., mixing of topsoil and subsoil), such that the material which is replaced during site reclamation will be substantially the same topsoil which was stripped from the site before the construction work began.

These legislated requirements necessitate accurate control of the depth to which the topsoil is stripped. Accurate depth control can be accomplished fairly easily using conventional earthmoving equipment such as graders and bulldozers when the soil is not frozen. The task is considerably more difficult, however, when the soil is frozen. One method which has been used to break up frozen topsoil involves the use of heavy ripping claws (or "rippers" as they are known in the prior art) mounted to the rear end of a bulldozer. The rippers may be lowered so as to engage and break up the frozen soil as they are pulled along behind the bulldozer. Each ripper typically has a hardened steel ripper tooth oriented generally downward and toward the front of the bulldozer, such that forward movement of the bulldozer tends to draw the ripper tooth down into the ground.

One practical problem with these prior art rippers is that instead of merely breaking up soil to the depth that they have been lowered into the ground, they tend to gouge out large irregular chunks of soil. Such chunks are inconvenient to handle and must be broken up into small particles before the topsoil can be rendered properly compactable and thus usable for site reclamation. As well, because conventional box beams typically can accommodate only two or three rippers, the rippers are spaced up to two feet or more apart from each other, with the result that a significant portion of the soil surface will not be directly penetrated by the ripper teeth in a given single pass by the bulldozer/ripper equipment.

Controlling the depth of soil penetration is a particular problem with conventional rippers. Due to the configuration and orientation of the ripper teeth, forward motion of the bulldozer may tend to draw the ripper teeth deeper into the ground than desired. Even if a bulldozer operator is able to control the depth of penetration of the rippers within a satisfactory tolerance, the chunks of soil removed using rippers often contain not only topsoil, but also substantial amounts of subsoil which has become bonded to the topsoil due to freezing. If such chunks of mixed topsoil and subsoil are eventually broken up, the inevitable result will be admixing, which may render the material unusable for reclamation purposes. This problem may be addressed by importing additional topsoil to replace any topsoil which was taken from the site but which was unusable due to unsuitable particle size or admixing, or both. However, this option is expensive or may be precluded where the relevant environmental legislation requires reclamation to be accomplished using materials originally present on the site, such that imported material is permitted only in small quantities, if at all.

Canadian Patent Application No. 2,237,001 (filed on Jul. 10, 1998 by Biegel et al. and laid open on Aug. 10, 1998) discloses one attempt to find a better way of stripping frozen topsoil to a desired depth. The frozen topsoil cutter taught by Biegel may be summarized as an implement which may be hitched to and pulled behind a bulldozer, with a number of cutting wheels rotating about horizontal axes perpendicular to the direction of travel. The cutting wheels are arranged in a "vee" formation, with the apex of the vee oriented toward the front of the bulldozer. As the bulldozer moves forward, the cutting wheels may penetrate into the frozen soil to a desired depth, thereby cutting and fragmenting the soil. In order for the cutting wheels to penetrate the frozen soil, they must operate under constant and substantial vertical loading. The required vertical loading may be provided by hydraulic rams associated with the bulldozer, or simply by adding removable weights to the frame of the implement.

The need for the cutting wheels to be under constant and substantial vertical loading is a significant disadvantage. If the loading is too small, the cutting wheels will not penetrate as deeply as desired, and the cutting procedure may have to be repeated in order to strip all of the topsoil. If the loading is too great, the cutting wheels may penetrate beneath the topsoil layer into the subsoil, resulting in undesirable admixing. Even when the thickness of the frozen topsoil is of a known and essentially constant thickness, in order for the Biegel implement to break up all of the topsoil, and only the topsoil, the downward force acting on the cutting wheels may require constant adjustment in response to variations in the soil's resistance to penetration. In any event, use of the Biegel device requires constant vigilance on the part of the operator to ensure that the desired results are being accomplished.

Considering all the foregoing factors, there is clearly a need in the art for a frozen topsoil plowing implement which can cut and loosen frozen topsoil to a desired depth below the ground surface, without also loosening soil from below the desired depth, and without loosening the topsoil in fragments of such dimensions that they would require further fragmentation or pulverizing in order to be suitable for land reclamation purposes. There is furthermore a need for a frozen topsoil plowing implement which does not require, for its effective functioning, the provision of vertical loads acting on the implement over and above the vertical loads inherently provided by the dead weight of the implement's structure.

SUMMARY OF THE INVENTION

In general terms, the invention is a soil plowing implement which disturbs soil to a desired and controllable depth and which breaks apart the soil into manageable chunks. The disturbed soil is pushed aside as the implement is drawn forward by a bulldozer or the like. The implement generally comprises the following elements:

(a) a scraping blade having a generally horizontal leading edge;

(b) a backer plate associated with the scraping blade wherein both the scraping blade and the backer plate are at a swept-back angle to the direction of travel;

(c) a vertical fin or fins attached to the upper side of the scraping blade;

(d) means for controlling the depth of the leading edge of the scraping blade; and (e) a support structure for rigidly attaching the implement to a motorized vehicle such as a bulldozer.

The scraping blade breaks up the soil to a desired depth while the vertical fins divide the plowed soil into smaller fragments, which are pushed aside by the angle of the blade and backing plate as the implement is drawn forward.

In one aspect of the invention, the leading edge is not swept back in a straight line but rather is broken up into a series of forward facing leading edges, which are staggered from front to back. In this preferred embodiment:

(a) the backer plate is substantially vertical and planar, having a front face and a rear face, said backer plate defining a substantially vertical leading edge and a trailing edge;

(b) the scraping blade comprises a plurality of chisel plates fastened to the front face of the backer plate and projecting forward and at a downward angle therefrom, each said chisel plate defining:

(i) a rear edge connected to the front face of the backer plate;

(ii) an inboard side edge and an outboard side edge, said side edges originating at opposite ends of the rear edge; and (iii) a leading edge, for engaging and penetrating soil, said leading edge extending between the lower ends of the inboard and outboard side edges;

said chisel plates being spaced apart from each other in staggered fashion; and (c) the vertical fins comprise plates which are attached between the outboard side edge of a chisel plate and the inboard side edge of the adjacent chisel plate and a generally vertical coulter plate connected to and extending above the inboard side edge of the most inboard chisel plate.

In the preferred embodiment of the invention, the cutting edge of each chisel plate has a plurality of teeth for penetrating into soil, and the teeth are replaceable.

Also in the preferred embodiment, the support structure comprises a substantially vertical mast positioned at or near the juncture of the backer plate and the coulter plate, with the mast extending vertically above the backer plate and the coulter plate, and having a hole near the top of the mast for receiving a bolt, pin, or similar component for connecting the mast to a box beam mounted on the vehicle.

The support structure of the preferred embodiment may further comprise a stabilizer arm bracket fastened to the backer plate at or near the upper rearmost portion of the backer plate, and further comprising a stabilizer arm mounted at one end to the stabilizer arm bracket and at the other end to a box beam on a motive power unit. Preferably the stabilizer arm is adjustable as to length, such as may be achieved by using a threaded rod as a component of the stabilizer rod.

The depth-control means of one embodiment comprises:

(a) a bracket rigidly attached to the support structure, said bracket having a substantially horizontal base plate with a plurality of bolt holes;

(b) a depth-control shoe having a substantially flat bottom surface, plus one or more studs extending upwardly from the depth-control shoe, for engagement with the bolt holes in said base plate; and (c) one or more shim plates having bolt holes to accommodate the studs of the depth-control shoe, a desired number of which shim plates may be positioned between the upper surface of the depth-control shoe and the bottom of the base plate of the mast bracket.

Alternatively, the depth-control means may comprise a hydraulic cylinder and piston, rigidly attached to the support structure, which is operative to raise or lower the depth-control shoe.

BRIEF DESCRIPTION OF THE DRAWINGS

The invention will now be described with reference to the accompanying drawings, in which numerical references denote like parts, and in which.

DETAILED DESCRIPTION OF THE PREFERRED EMBODIMENT

Figure 1:
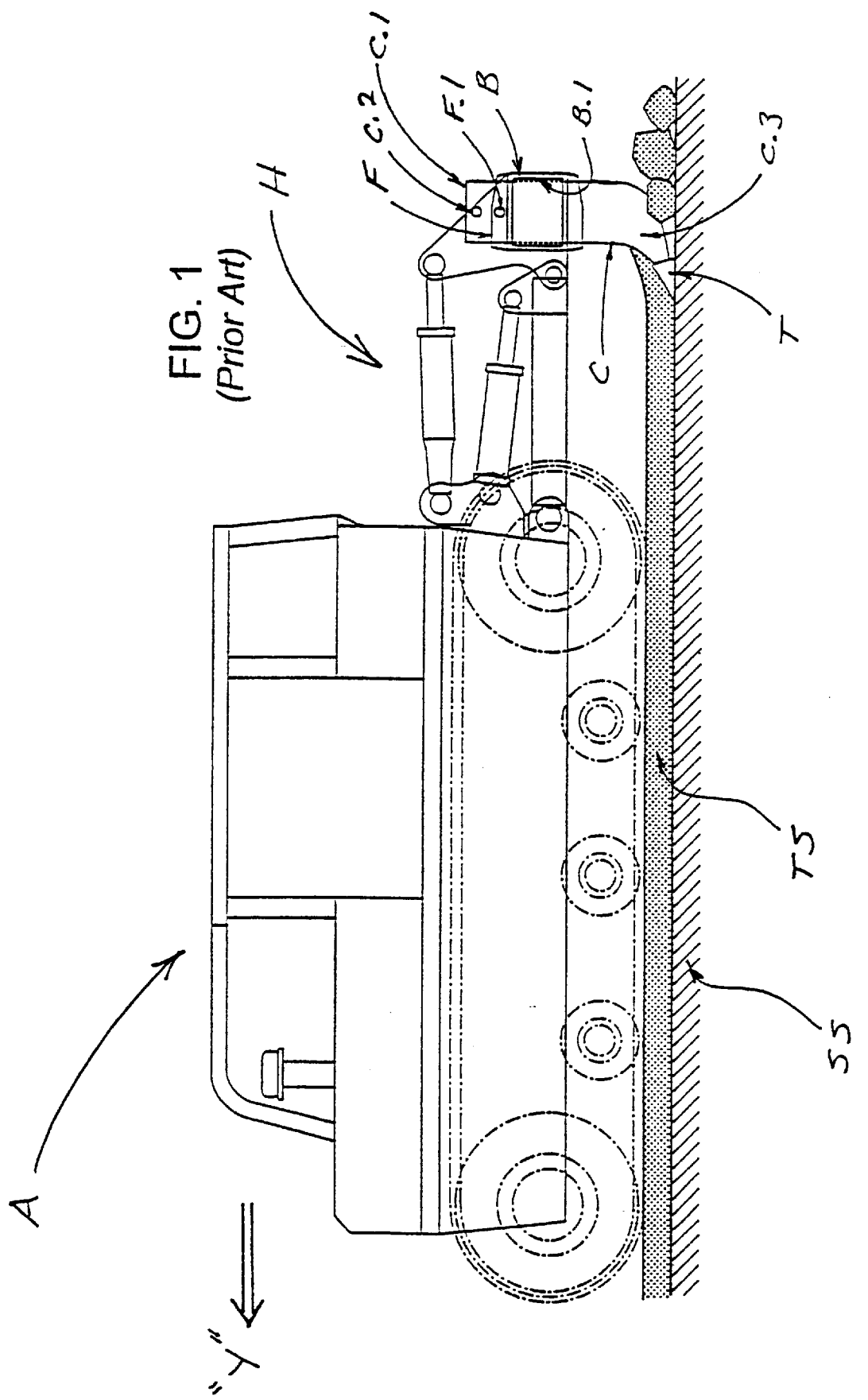
FIG. 1 is an elevational view of a prior art ripper mounted to a box beam mounted at the rear of a tractive power unit such as a bulldozer.

The present invention is perhaps best understood after first reviewing prior art rippers, a practical application of which is illustrated in FIG. 1. A bulldozer, denoted by reference symbol (A), is fitted with a rear-mounted box beam (B) by means of an assembly of hydraulic cylinders and drawbars (such assembly being generally denoted by reference letter (H) in FIG. 1). Box beam (B) defines, at various points along its length, a number of slots (B.1) passing vertically through the box beam such that desired implements may be inserted therethrough. Either side of each slot (B.1) there is a flange (F) further defining the slot (B.1) and also having a hole (F.1) for receiving a bolt or retainer pin, for retaining an implement in a desired vertical position within slot (B.1).

In the arrangement shown in FIG. 1, a number of ripper claws (or "rippers") (C) have been positioned in slots (B.1). Each ripper (C) comprises a vertical stem (C.1) which passes through a corresponding slot (B.1) in the box beam, and which defines one or more holes (C.2) for receiving a bolt or retainer pin passing through flange holes (F.2). Each ripper (C) further comprises a lower section (C.3) having a ripper tooth (T). As may be readily visualized from considering FIG. 1, as bulldozer (A) moves forward (in the direction indicated by arrow "Y"), ripper teeth (T) dig into and disturb a surficial topsoil layer (TS) lying over the subsoil (SS). The depth to which the ripper teeth (T) penetrate into the ground typically is controlled partially or entirely by manipulation of the hydraulic cylinders of assembly (H).

Figure 2:
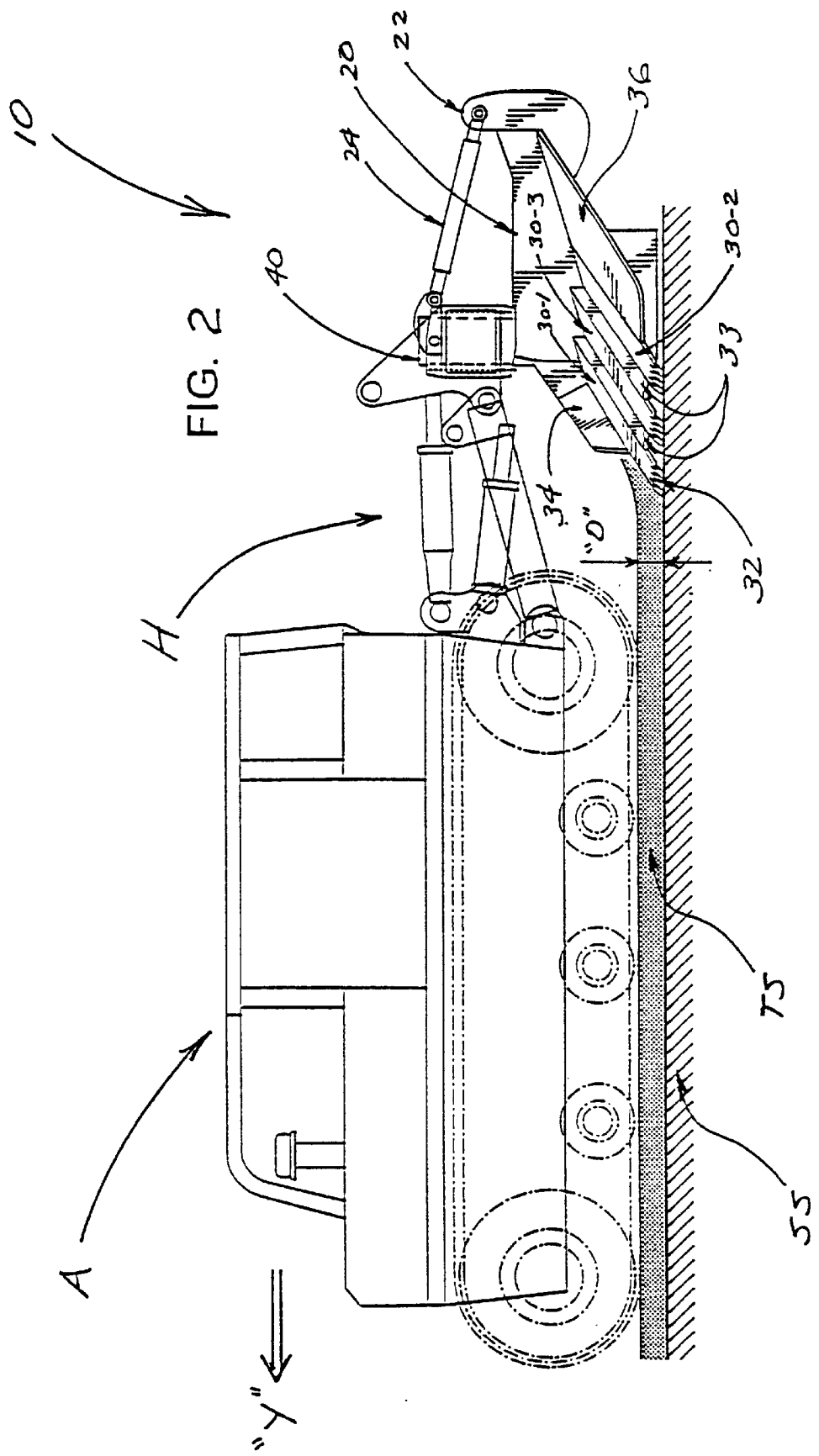
FIG. 2 is an elevational view of the preferred embodiment of the present invention mounted to a box beam mounted at the rear of a tractive power unit such as a bulldozer.

FIG. 2 illustrates the preferred embodiment of the topsoil plow of the present invention, generally denoted by reference numeral (10), mounted to the bulldozer (A) and box beam (B) shown in FIG. 1. As more particularly illustrated in FIGS. 3 and 4, plow (10) comprises a substantially vertical backer plate (20) which is raked relative to the direction of travel "Y" and therefore has a leading edge (20a) and a trailing edge (20b). The backer plate (20) is connected at leading edge (20a) to a substantially vertical mounting mast (40), which is configured so as to fit within one of the slots (B.1) of box beam (B) and includes a hole (42) for receiving a bolt or retainer pin, thereby to mount the topsoil plow (10) securely to the box beam (B).

In the preferred embodiment, a stabilizer arm bracket (22) is connected to the backer plate (20) in the general vicinity of trailing edge (20b). As illustrated in FIG. 2, a stabilizer arm (24) may be mounted between the stabilizer arm bracket (22) and box beam (B) so as to enhance the lateral and vertical stability of the topsoil plow relative to the box beam (B) and the bulldozer (A). The stabilizer arm preferably will be an adjustable member, such as a threaded rod within a threaded sleeve.

Figure 3:
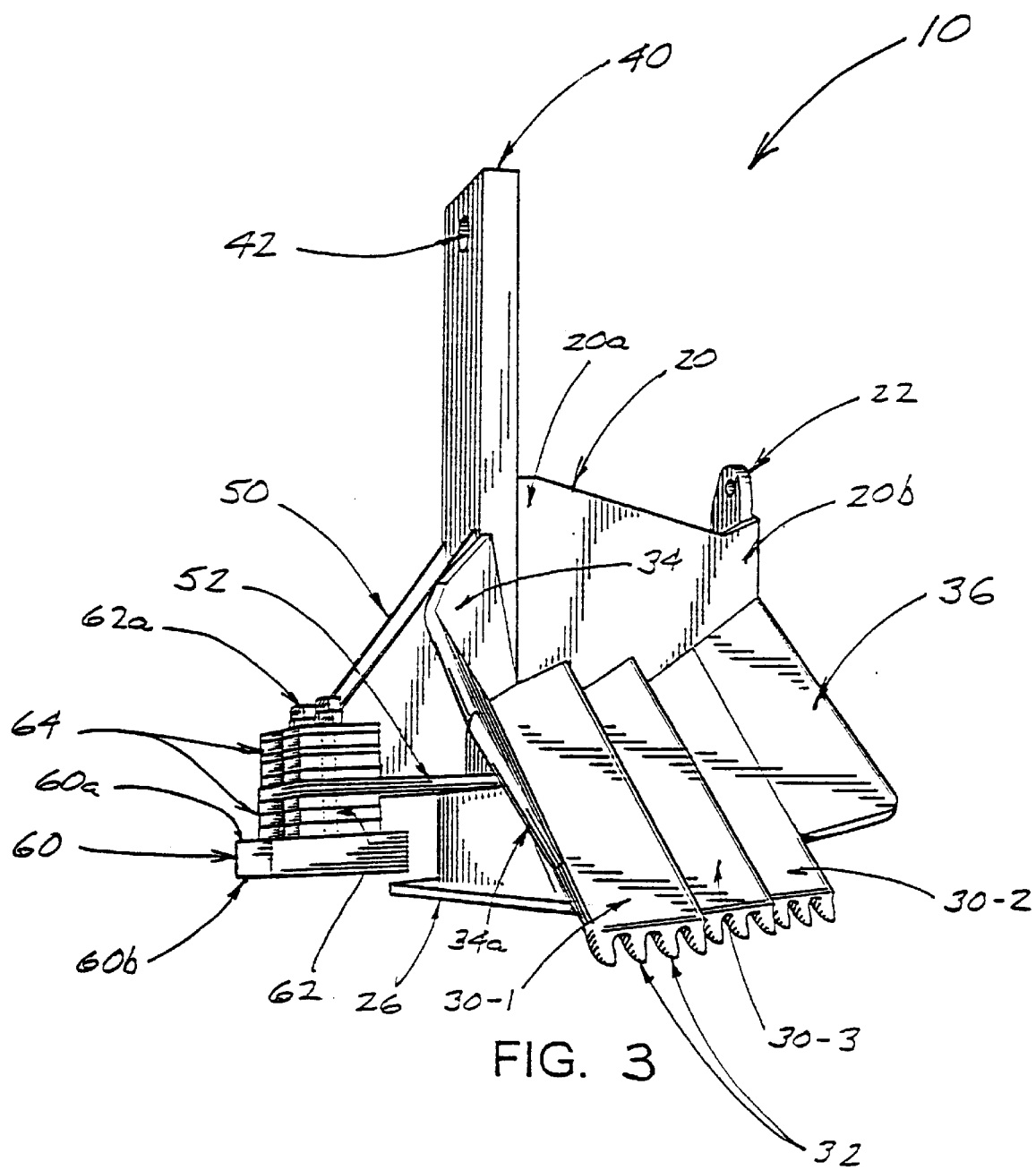
FIG. 3 is a perspective view of the preferred embodiment of the invention.
Figure 4:
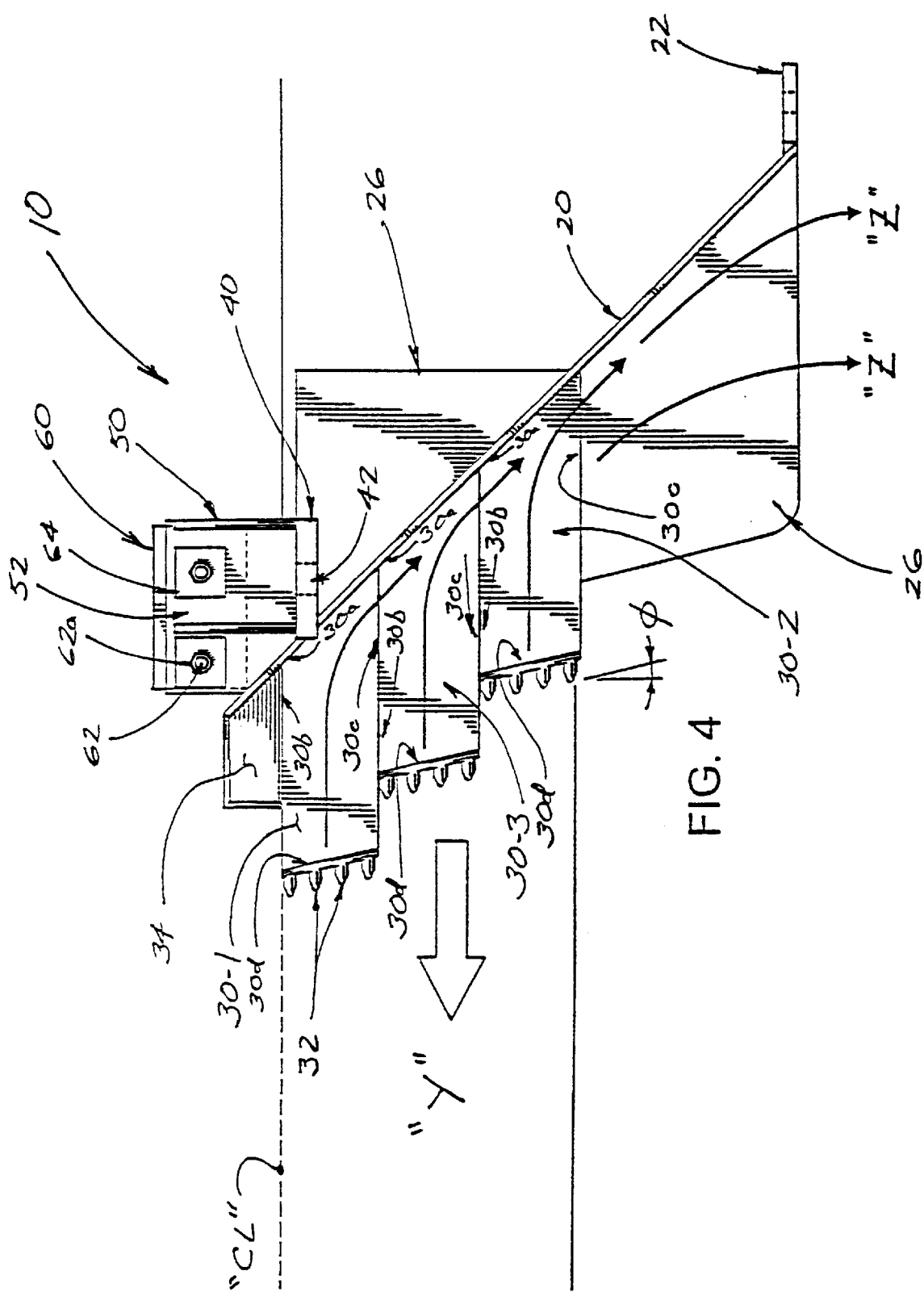
FIG. 4 is a plan view of the preferred embodiment.

A plurality of chisel plates (30) are rigidly connected, such as by bolting or welding, to the front of backer plate (20) as shown in FIGS. 2, 3, and 4. In a preferred embodiment, there are three chisel plates (30) which may be further defined as the inboard chisel plate (30-1), the outboard chisel plate (30-2), and intermediate chisel plate or plates (30-3). Although other configurations could be used without departing from the basic concept and operational principles of the invention, each chisel plate (30) in the preferred embodiment will be quadrilateral in shape, defining rear edge (30a), inboard side edge (30b), outboard side edge (30c), and cutting edge (30d). In the preferred embodiment, each cutting edge (30d) has a plurality of replaceable cutting teeth (32), which may be of the known sort commonly used on the blades of bulldozers and road graders. As illustrated in FIG. 4, the cutting edges (30d) in the preferred embodiment are swept rearward at a desired angle ($\phi$).

Referring to FIG. 2, it may be seen that the chisel plates (30) project forward and downward from the backer plate (20) such that all of the cutting edges (30d) lie in substantially a common plane substantially parallel to the ground surface. As illustrated in FIGS. 2 and 4, the chisel plates (30) are spaced apart from each other, in staggered fashion both laterally and from front to back. Although it is not essential to the invention, in the preferred embodiment the chisel plates (30) will lie in substantially parallel planes, with the inboard side edge (30b) of a given chisel plate (30) lying in the same substantially vertical plane as the outboard side edge (30c) of the adjacent chisel plate (30); this preferred feature is illustrated in FIG. 4. Also in the preferred embodiment, and as shown in FIG. 2, adjacent inboard side edges (30b) and outboard side edges (30c) are interconnected by filler plates (33) so as to close off the spaces defined thereby.

In the preferred embodiment, as shown in FIGS. 2, 3, and 4, an extension plate (36) is connected to and extends outboard from the outboard side edge (30c) of outboard chisel plate (30-2). As will be explained in greater detail hereinafter, extension plate (36) assists in directing and depositing excavated material laterally away from the area being excavated by the implement as it is drawn along by the bulldozer (A) or other power unit.

As illustrated in FIGS. 2, 3, and 4, the present invention also includes a coulter plate (34) adjacent to inboard chisel plate (30-1), and extending in a generally forward direction. One function of the coulter plate (34) is to act as a deflector assisting to direct excavated soil laterally over the chisel plates (30). In the preferred embodiment illustrated in FIGS. 2, 3, and 4, the coulter plate (34) is rigidly connected, such as by bolting or welding, to the mounting mast (40), and has a sharpened front edge (34a) to enhance the invention's ability to cut through soil as it is drawn forward by the bulldozer (A). Alternatively, the front edge (34a) may have cutting teeth (not shown) similar to those on the chisel plates (30). The Figures also illustrate the coulter plate (34) of the preferred embodiment as being a bent plate with a lateral cant, but the coulter plate (34) could be configured in a number of different ways without departing from the concept of the invention.

Figure 5:
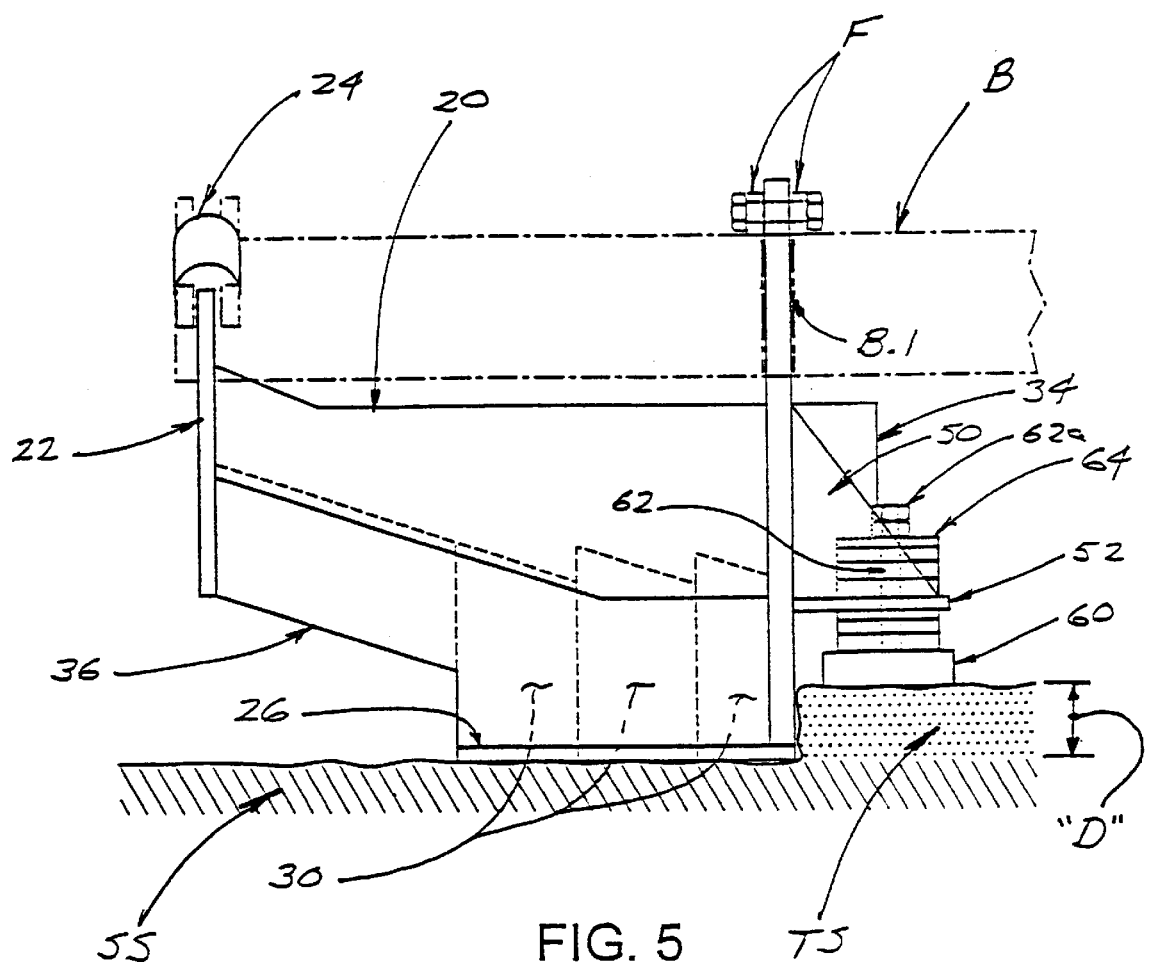
FIG. 5 is an elevational view of the invention as viewed from the rear.

To enhance the stiffness and rigidity of the chisel plates, the preferred embodiment of the invention also incorporates a base member (26) extending between the cutting edges (30d) and the backer plate. Base member (26) may be a horizontal flat plate connected, such as by welding, to the rear faces of the chisel plates (30) slightly above cutting edges (30d) and to the backer plate (20), as illustrated in FIGS. 4 and 5. This plate may extend rearward behind the backer plate (20), as illustrated in FIG. 4 or in some other desired configuration.

The present invention also incorporates depth-control means, for controlling and adjusting the depth to which the cutting edges (30d) of the chisel plates (30) penetrate into the soil. In the preferred embodiment, as illustrated in FIGS. 3, 4, and 5, the depth-control means comprises a mast bracket (50) cantilevering from mast (40) on the side opposite from the chisel plates (30). In the Figures, the mast bracket (50) is shown as being fashioned in part from a pair of triangular plates; however, this is not essential to the invention, as the mast bracket (50) may take any of various forms without affecting its function for purposes of the invention. The mast bracket (50) has a horizontal base plate (52), which in turn has one or more bolt holes (52a), the purpose of which will be made evident hereinafter.

The depth-control means of the preferred embodiment also includes a depth-control shoe (60), which has an upper surface (60a) and a substantially flat bottom surface (60b) plus one or more studs (62) projecting upper surface (60a), said stud or studs being arranged so as to mate with the bolt hole or bolt holes (52a) in base plate (52) of the mast bracket (50). The studs (62) may conveniently be threaded studs, each being provided with one or more nuts (62a) as shown in FIGS. 3, 4, and 5. One or more shim plates (64), of any convenient desired shape, are provided as well, each shim plate (64) having a hole to accommodate one of the studs (62). It may be readily seen that the vertical position of the depth-control shoe (60), relative to mast bracket (50) as well as relative to the cutting edges (30d) of chisel plates (30), may be selectively controlled by clamping a desired number of shim plates (64) between the base plate (52) of mast bracket (50), and the upper surface (60a) of depth control shoe (60), using the studs (62) and nuts (62a). As best illustrated in FIGS. 3 and 5, spare shims (64) not being directly used for adjusting the position of depth-control shoe (60) may be conveniently stored on the upper side of base plate (52), and held in position by the studs (62), until they are needed.

As the implement (10) is drawn forward, the downward angle of the chisel plates causes the implement to "dig in" or tend to dig deeper. This force is counteracted by the shoe (60) which rides the surface of the ground to hold the implement at the desired depth.

Alternatively, the depth-control shoe (60) may be mounted on a hydraulic cylinder (not shown) to control its vertical position. The hydraulic cylinder would be rigidly connected to the mast (40) and controlled from the bulldozer (A) by conventional means.

The operation of the preferred embodiment may be easily understood with reference to FIGS. 2, 4, and 5 in particular. Desirably, the operator will know the depth of the topsoil layer (T) to be excavated. The depth-control shoe (60) is adjusted, using studs (62) and shims (64), such that the vertical distance between the bottom surface (60b) of depth-control shoe (60), and the teeth (30) on the cutting edges (30d) of chisel plates (30), generally matches known depth "D" of topsoil layer (T) in the area being worked. When bulldozer (A) is then driven forward (i.e., in direction "Y"), cutting edges (30d) and teeth (32) are drawn downward into the soil. As conceptually denoted by arrows "Z" in FIG. 4, the forward motion of the invention causes excavated soil to be pushed rearward and upward along the surfaces of the chisel plates (30), and then to be deflected laterally outboard by backer plate (20), over adjacent chisel plates (30) and extension plate (36), to spill onto the ground surface in windrows (not shown) which may be conveniently removed by conventional earth-handling equipment.

As best seen in FIG. 5, bottom surface (60b) of depth-control shoe (60) rides on top of unexcavated soil immediately adjacent to the area being penetrated by chisel plates (30). Because the depth-control shoe (60) is rigidly mounted in relation to the chisel plates (30), it is not possible for the chisel plates (30) to penetrate the soil to a depth greater than the pre-set depth "D". When an area having a different topsoil depth "D" is encountered, the operator can make a corresponding adjustment to the depth-control shoe (60) by adding or removing shim plates (64) under base plate (52), and then continue the topsoil plowing operation.

As best illustrated by FIG. 4, cutting edges (30d) and teeth (32) of chisel plates (30) provide for substantially continuous excavation of the soil across the full width of the area being excavated on a single pass of the equipment, unlike the case with conventional rippers which typically penetrate the ground only at spaced intervals. As a result, the soil excavated using the present invention tends to be broken up into smaller and generally more manageable fragments than usually achievable using rippers. As well, use of the present invention largely eliminates and prevents the problem of large chunks of excavated soil with significant amounts of inorganic subsoil from below the desired depth of excavation.

It will readily seen by those skilled in the art that, although the present invention has been particularly described in the context of its use for excavating frozen soil, the invention may also be effectively employed for excavating unfrozen soil. It will also be apparent to those skilled in the art that various modifications adaptations may be devised without departing from the teachings of the present invention, and all such modifications and adaptations are expressly intended to be included within the scope of the claims appended hereto.

The embodiments of the invention in which an exclusive property or privilege is claimed are defined as follows:

1. A soil-plowing implement, for being mounted to and moved by a motorized vehicle including a bulldozer, said implement comprising:
   (a) a scraping blade having a generally horizontal leading edge and comprising a plurality of chisel plates fastened to the front face of the backer plate and projecting forward and at a downward angle therefrom, each said chisel plate defining:
      (i) a rear edge connected to the front face of the backer plate;
      (ii) an inboard side edge and an outboard side edge, said side edges originating at opposite ends of the rear edges and each having a lower end; and
      (iii) a leading edge, for engaging and penetrating soil, said leading edge extending between the lower ends of the inboard and outboard side edges;
   (b) a backer plate associated with the scraping blade wherein both the scraping blade and the backer plate are at a swept-back angle to the direction of travel, wherein said backer plate is substantially vertical and planar, having a front face and a rear face, said backer plate defining a substantially vertical forward edge and a trailing edge;
   (c) a vertical fin or fins attached to an upper side of the scraping blade, wherein the vertical fin or finds comprise plates which are attached between the outboard side edge of a chisel plate and the inboard side edge of the adjacent chisel plate and a generally vertical coulter plate connected to and extending above the inboard side edge of the most inboard chisel plate;
   (d) means for controlling vertical depth of the leading edge of the scraping blade relative to the soil; and
   (e) a support structure for rigidly attaching the implement to the motorized vehicle.

2. The implement of claim 1 wherein the leading edge of each chisel plate has a plurality of teeth for penetrating into soil.

3. The implement of claim 2 wherein the teeth are replaceable.

4. The implement of claim 1 wherein the support structure comprises a substantially vertical mast associated with the backer plate, said mast extending vertically above the backer plate and the coulter plate, and defining an upper opening for receiving a bolt or pin for connecting the mast to a box beam mounted on the vehicle.

5. The implement of claim 4 wherein the support structure further comprises a stabilizer arm bracket fastened to the backer plate in the vicinity of the trailing edge, and further comprising a stabilizer arm mounted at one end to the stabilizer arm bracket and at the other end to a box beam on a motive power unit.

6. The implement of claim 5 wherein the length of the stabilizer arm is adjustable as to length.

7. The implement of claim 5 wherein the outboardmost chisel plate has an extension plate, extending outboard from and in substantially the same plane as the outboardmost chisel plate.

8. The implement of claim 7 wherein the extension plate is configured so as to engage the stabilizer arm bracket.

9. The implement of claim 1 wherein the depth-control means comprises:
   (a) a bracket rigidly attached to the support structure, said bracket having a substantially horizontal base plate with a plurality of bolt holes and a bottom surface;
   (b) a depth-control shoe having an upper surface, a substantially flat bottom surface and one or more studs extending upwardly from the depth-control shoe, for engagement with the bolt holes in said base plate; and
   (c) one or more shim plates having bolt holes to accommodate the studs of the depth-control shoe, a desired number of which shim plates may be positioned between the upper surface of the depth-control shoe and the bottom surface of the base plate of the mast bracket.

10. The implement of claim 1 wherein the depth-control means comprises a depth-control shoe and a hydraulic cylinder and piston which is operative to raise and lower the depth control shoe.

11. The implement of claim 1 further comprising a substantially horizontal base member connected to the chisel plates slightly above the leading edges thereof, and extending rearward from the chisel plates and connecting to the backer plate.

* * * * *